US008915533B2

United States Patent
Linnenkohl et al.

(10) Patent No.: US 8,915,533 B2
(45) Date of Patent: Dec. 23, 2014

(54) MODULAR DOOR DRIVE

(75) Inventors: Lars Linnenkohl, Staufenberg (DE); Andreas Pellegrini, Edermunde (DE)

(73) Assignee: Gebr. Bode GmbH & Co. KG (DE)

( * ) Notice: Subject to any disclaimer, the term of this patent is extended or adjusted under 35 U.S.C. 154(b) by 12 days.

(21) Appl. No.: 13/876,424

(22) PCT Filed: Sep. 22, 2011

(86) PCT No.: PCT/EP2011/066525
§ 371 (c)(1),
(2), (4) Date: Jun. 6, 2013

(87) PCT Pub. No.: WO2012/041762
PCT Pub. Date: Apr. 5, 2012

(65) Prior Publication Data
US 2013/0298706 A1 Nov. 14, 2013

(30) Foreign Application Priority Data
Sep. 28, 2010 (DE) ............... 20 2010 008 648 U

(51) Int. Cl.
*B60J 5/06* (2006.01)
*E05F 15/14* (2006.01)

(52) U.S. Cl.
CPC ............. *B60J 5/06* (2013.01); *E05F 15/148* (2013.01); *E05Y 2201/434* (2013.01); *E05Y 2600/626* (2013.01); *E05Y 2800/17* (2013.01); *E05Y 2800/172* (2013.01); *E05Y 2800/232* (2013.01); *E05Y 2900/51* (2013.01)

USPC ........................................ 296/155

(58) Field of Classification Search
CPC ..................................... E05F 15/14
USPC .............. 296/155; 49/94, 404, 414, 36
See application file for complete search history.

(56) References Cited

U.S. PATENT DOCUMENTS

2006/0289128 A1* 12/2006 Ressel et al. .......... 160/188
2007/0278822 A1* 12/2007 Mueller ................. 296/155

FOREIGN PATENT DOCUMENTS

EP 0725201 8/1996
EP 1314626 5/2003

OTHER PUBLICATIONS

ISR PCT/EP2011/066525 dtd Dec. 27, 2011.

* cited by examiner

*Primary Examiner* — Lori L Lyjak
(74) *Attorney, Agent, or Firm* — Cantor Colburn LLP

(57) ABSTRACT

A drive device for a sliding door or a pivot and slide door of a transportation vehicle including at least one runner mounter such that it can at least move linearly so as to move a door leaf attached to the latter. A motor is attached to the runner of to the transportation vehicle. A first transmission mechanism between the motor and the runner affects the longitudinal displacement of the runner. Between the motor and the first transmission mechanism at least two attachment options are provided which differ in the arrangement relationship of the first transmission mechanism and the motor.

10 Claims, 5 Drawing Sheets

MODULAR DOOR DRIVE

FIELD

The disclosure concerns a drive device and also entry/exit facilities for a passenger transportation vehicle, with a runner mounted such that it can move linearly so as to move a door leaf attached to the latter, a motor attached to the runner, or to the passenger transportation vehicle, and a first transmission mechanism between the motor and runner so as to effect at least the longitudinal displacement of the runner.

BACKGROUND

Drive devices, in particular for passenger doors on public transport vehicles are often arranged in the region of the door frame or door portal, above an access opening defined by the frame or portal. Pivot-and-slide doors are, for example, described in EP 10 409 79 A2 and EP 13 146 26 A1. The drives that are shown in these documents are particularly suitable for so-called pivot-and-slide doors, that is to say entry/exit facilities in which the door leaf executes an opening and closing procedure with both a pivotal movement and also a sliding movement along the longitudinal axis of the vehicle.

The volume around the door opening, which is usually limited, makes the arrangement of the drive device difficult, in particular each installation conditions makes necessary a specific arrangement relationship, in particular between the motor and the transmission mechanism driving the runner. It is therefore usually necessary to produce and stock specific components for each installation conditions. This makes the manufacture and maintenance of such drive devices more expensive.

SUMMARY

This disclosure endeavors to reduce the manufacturing and stock maintenance costs, and in particular to reduce the number of components, that is to say their diversity. This task is solved by means of the drive device in Claim 1, and also by the entry/exit facility and the passenger transport vehicle of the coordinate claims. Advantageous configurations are in each case the subjects of the dependent claims. Here it is to be noted that the individually listed features in the claims can be combined with one another in any technologically logical manner, and indicate further configurations of the disclosure. The description additionally characterises and specifies the disclosure, in particular in conjunction with the figures.

The disclosure concerns a drive device for a sliding door, or a pivot-and-slide door, of a passenger transport vehicle. The disclosure is not limited with regard to the configuration of the mounting arrangement and the kinematics of the door, or the door leaf, or the number of door leaves used. The drive device has at least one runner mounted such that it can move at least linearly, so as to move a door leaf that is attached to the latter. The direction of movement preferably occurs in the longitudinal direction of the passenger vehicle. The drive device is preferably arranged above or below a door opening. The runner and the door leaf are, for example, rigidly connected with one another, or have an articulated connection.

In accordance with the disclosure the drive device furthermore comprises a motor. This is either attached to the runner, and therefore moves together with the latter, or is attached to the passenger transport vehicle, so as to be at rest relative to the runner, and thus so as to simplify the electrical cabling compared with the above-mentioned variant that moves together with the runner. The drive device further comprises a first transmission mechanism between motor and runner so as to effect at least the linear displacement of the runner. The drive device is also not limited with regard to this transmission mechanism. It can, for example, also take the form of a belt or chain drive for the runner, which is not described in what follows.

The disclosure drive device is distinguished by the fact that between the motor and the first transmission mechanism at least two attachment options are provided, for example on the passenger transport vehicle or on the runner, which differ in the arrangement relationship of the first transmission mechanism and the motor. In this manner the arrangement of the first transmission mechanism and motor can be varied depending upon the installation conditions. For example, a plurality of attachment mountings, such as bearing blocks or threaded holes, and similar, are provided for the motor. The inventive motor is, for example, an electric motor. A step-down transmission mechanism can furthermore be flanged onto the motor.

The device may include a supporting structure, on which the at least two attachment options for the motor are provided. The supporting structure is, for example, attached to the passenger vehicle. The supporting structure can furthermore have at least one guide rail or guide rod for the runner.

In at least one of the arrangement relationships a drive shaft of the motor is preferably arranged coaxially with an input shaft of the first transmission mechanism.

In accordance with a further advantageous configuration, in at least one of the arrangement relationships the drive shaft of the motor is arranged parallel to an axis or shaft of the first transmission mechanism. In this arrangement relationship a belt transmission, preferably a toothed belt transmission, is provided between the axis or shaft, and the drive shaft of the motor.

By virtue of the particularly compact configuration that ensues from the above arrangement, the first transmission mechanism has a spindle transmission with at least one spindle nut in each case attached to the runner, and a spindle. The drive shaft of the motor in one of the arrangement relationships is, for example, arranged coaxially with the spindle. As a result a drive device is obtained with an elongated configuration with little lateral extent, and advantageously a motor that is located at one end, which simplifies the formation of electrical contacts with the motor. In the other arrangement relationship the drive shaft of the motor is aligned parallel to the spindle. As a result the longitudinal extent of the drive device is essentially prescribed only by the length of the spindle.

A coupling, preferably a universal joint, is provided between the first transmission mechanism and the drive shaft of the motor.

In accordance with a further configuration a locking mechanism is provided for purposes of locking and unlocking the door leaf, and a second transmission mechanism is provided between the motor and the locking device so as to effect the locking and/or unlocking action. The disclosure is not limited with regard to the locking mechanism. It can, for example, take the form of a rotary latch, and a pawl that interacts with the rotary latch. The rotary latch interacts for example, with a locking bolt located on the door leaf. The disclosure is likewise not limited with regard to the second transmission mechanism. The latter preferably takes the form of a lever mechanism.

The motor is preferably mounted such that it has a pivotal or rotary movement capability, wherein a rotary or pivotal movement of the motor is effected in the event of restraint or jamming of the first transmission mechanism and/or a change of drive direction of the motor, which movement is transferred by means of the second transmission mechanism onto the locking mechanism, so as to effect the locking and/or unlocking of the door leaf. Thus by means of just one motorised drive both the movement of the door leaf and also its unlocking or locking action can be effected.

The disclosure further concerns an entry/exit facility for a passenger transport vehicle with a drive device in one of the above-described forms of embodiment and with at least one door leaf.

The disclosure further concerns a passenger transport vehicle that has the advantageous, above-mentioned entry/exit facility.

BRIEF DESCRIPTION OF THE FIGURES

The disclosure and also the technical environment are explained in more detail in what follows on the basis of the figures. Here it is to be noted that the figures show a particularly preferred variant of embodiment of the disclosure, but that the latter is not limited to this embodiment. Here in schematic form.

DETAILED DESCRIPTION

Figure 1:
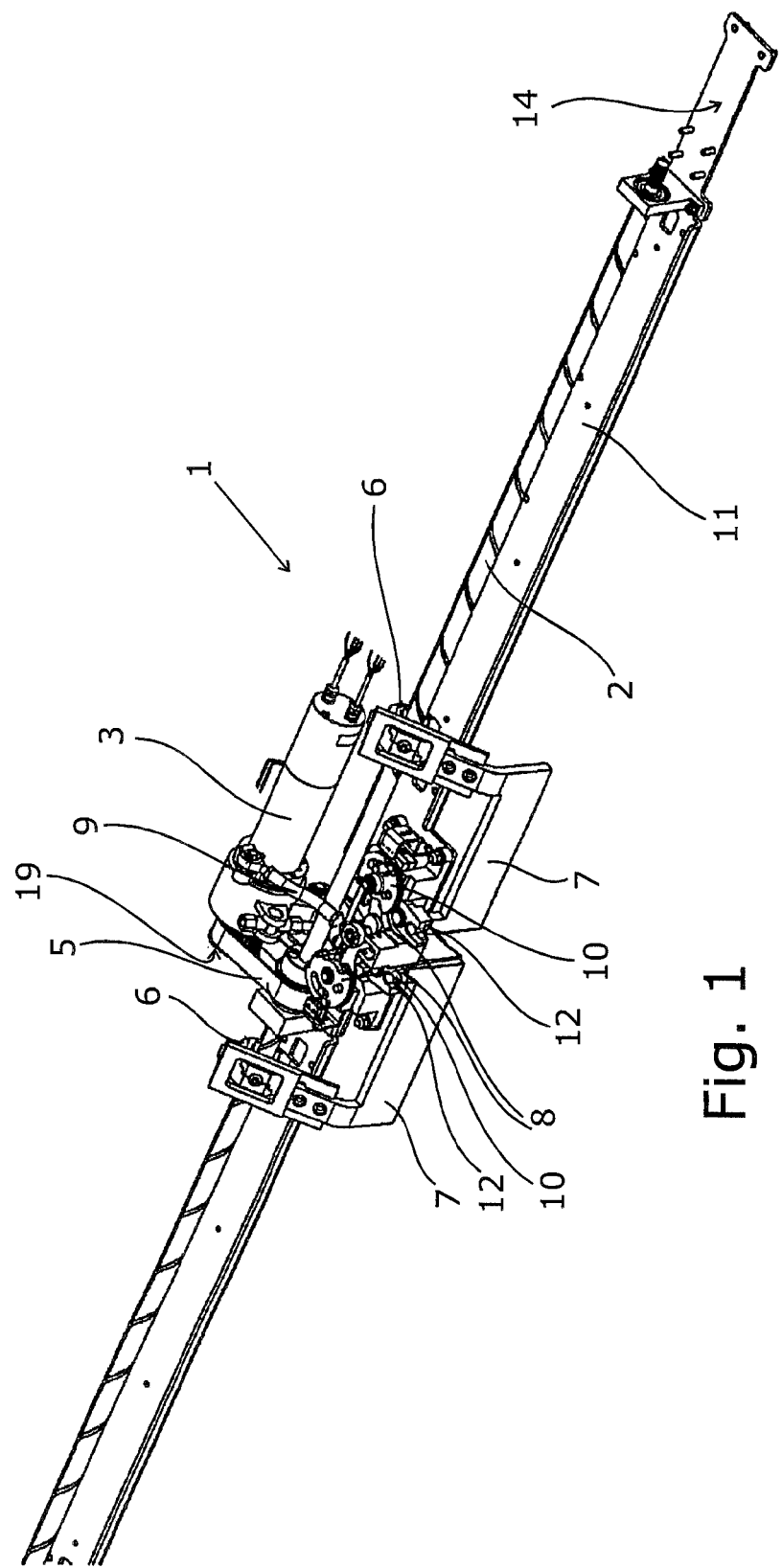
FIG. 1: shows a view in perspective of a form of embodiment of the inventive drive device in a first arrangement relationship of motor and first transmission mechanism.
Figure 2:
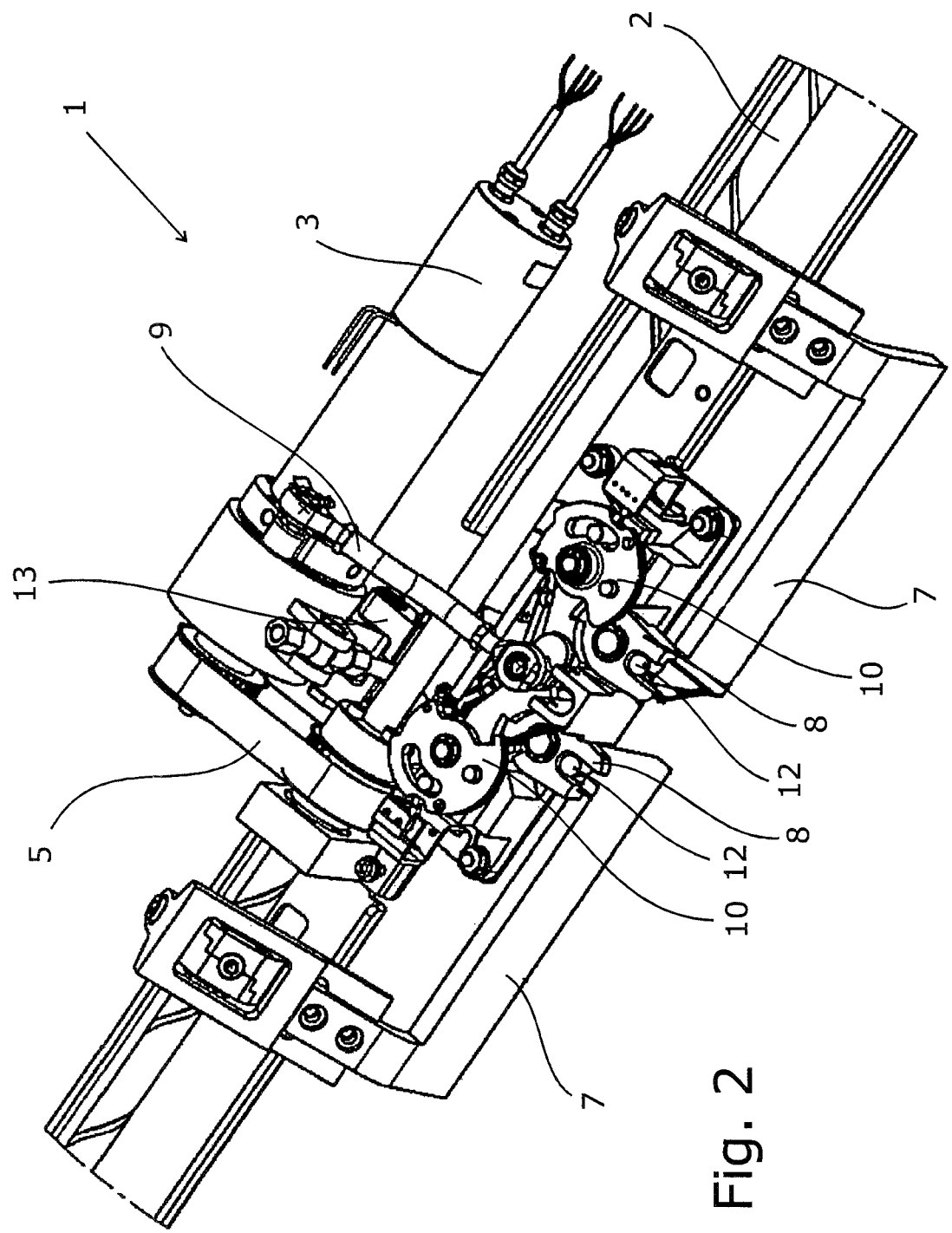
FIG. 2: shows a detailed view in perspective of the form of embodiment shown in FIG. 1.
Figure 5:
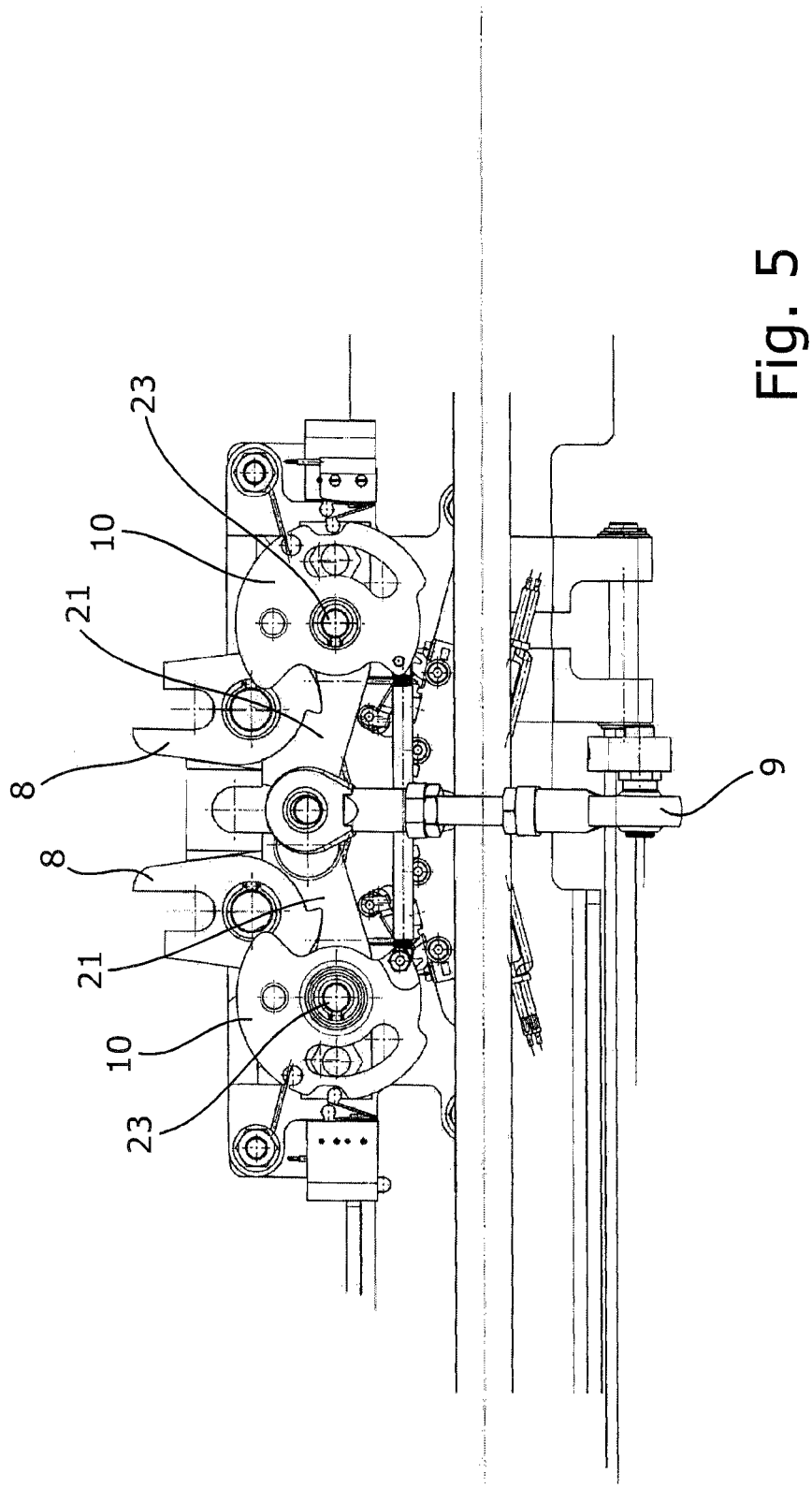
FIG. 5: shows a plan view onto the second transmission mechanism.

In the form of embodiment 1 of the inventive drive device shown in FIG. 1 two runners 7 are linearly displaced by means of an electric motor 3 and a first transmission mechanism 5, 2, 6. Door leaves, which are not represented, are attached to the runners 7; the former serve the purpose of closing a door opening, also not represented. The first transmission mechanism 5, 2, 6 comprises a spindle drive 2, 6, wherein a spindle 2 driven by the motor 3 and mounted in a supporting structure 11 is set into rotation and the spindle nuts 6 run on the spindle 2 and move, depending upon the direction of rotation of the spindle 2, in one of the axial directions of the spindle 2. The runners 7 are attached to the spindle nuts 6, and move together with the latter. A cardanic form of mounting arrangement is provided for the spindle nuts 6 on the runners 7. In the arrangement relationship represented in FIG. 1 the drive shaft 19 of the motor is arranged between the motor 3 and the first transmission mechanism 5, 2, 6 parallel to an axis or shaft of the first transmission mechanism 5, 2, 6, here this is the axis of the spindle 2. For this arrangement relationship an attachment option 13 is provided in the form of a bearing block on the supporting structure 11. For purposes of transferring the driving force of the motor 3 onto the spindle 2 the first transmission mechanism furthermore comprises a toothed belt transmission 5. A second transmission mechanism 9, 10, 21 is furthermore provided, which effects a locking and unlocking of the runner 7, and is represented in detail in FIG. 5. For this purpose locking bolts 12 are provided on the runners 7, which in each case interact with a related locking mechanism comprising rotary latches 8 and pawls 21, so as to effect the locking action.

The second transmission mechanism comprises a lever mechanism with a push-pull rod 9, which effects an unlocking of the pawls 21. It is likewise possible to unlock the rotary latches 8 via the roller cams 10. The pawls 21 and the roller cams sit on a common shaft 23. In the event of restraint or jamming of the first transmission mechanism 5, 2, 6, for example when arriving at the end positions of the door leaves, the pivoting action is effected in one of the end positions of the motor 3. With a change in the drive direction a reverse pivoting action is effected. This pivoting action backwards and forwards can in turn effect an unlocking or locking of the locking mechanism, wherein this pivoting action is transferred through the push-pull rod 9 onto the locking mechanism.

Figure 3:
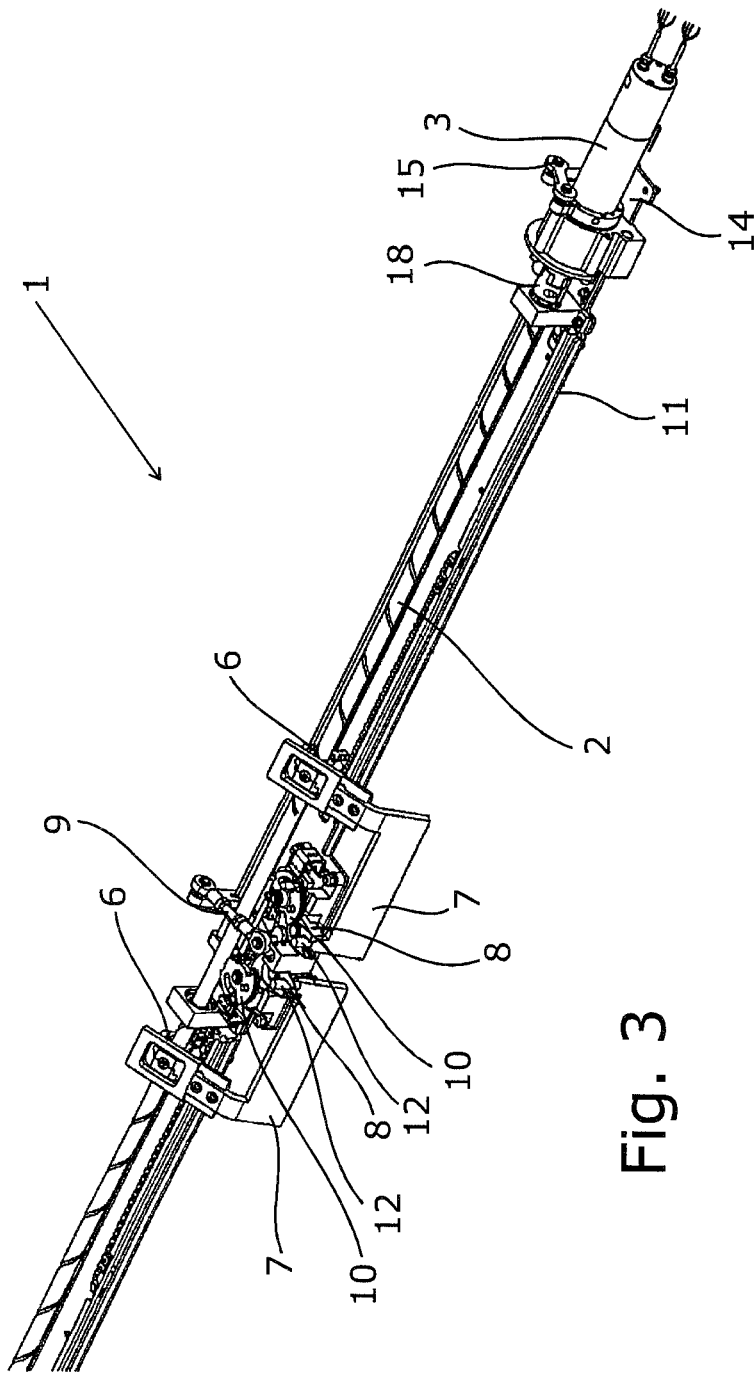
FIG. 3: shows a view in perspective of a form of embodiment of the inventive drive device in a second arrangement relationship of motor and first transmission mechanism.
Figure 4:
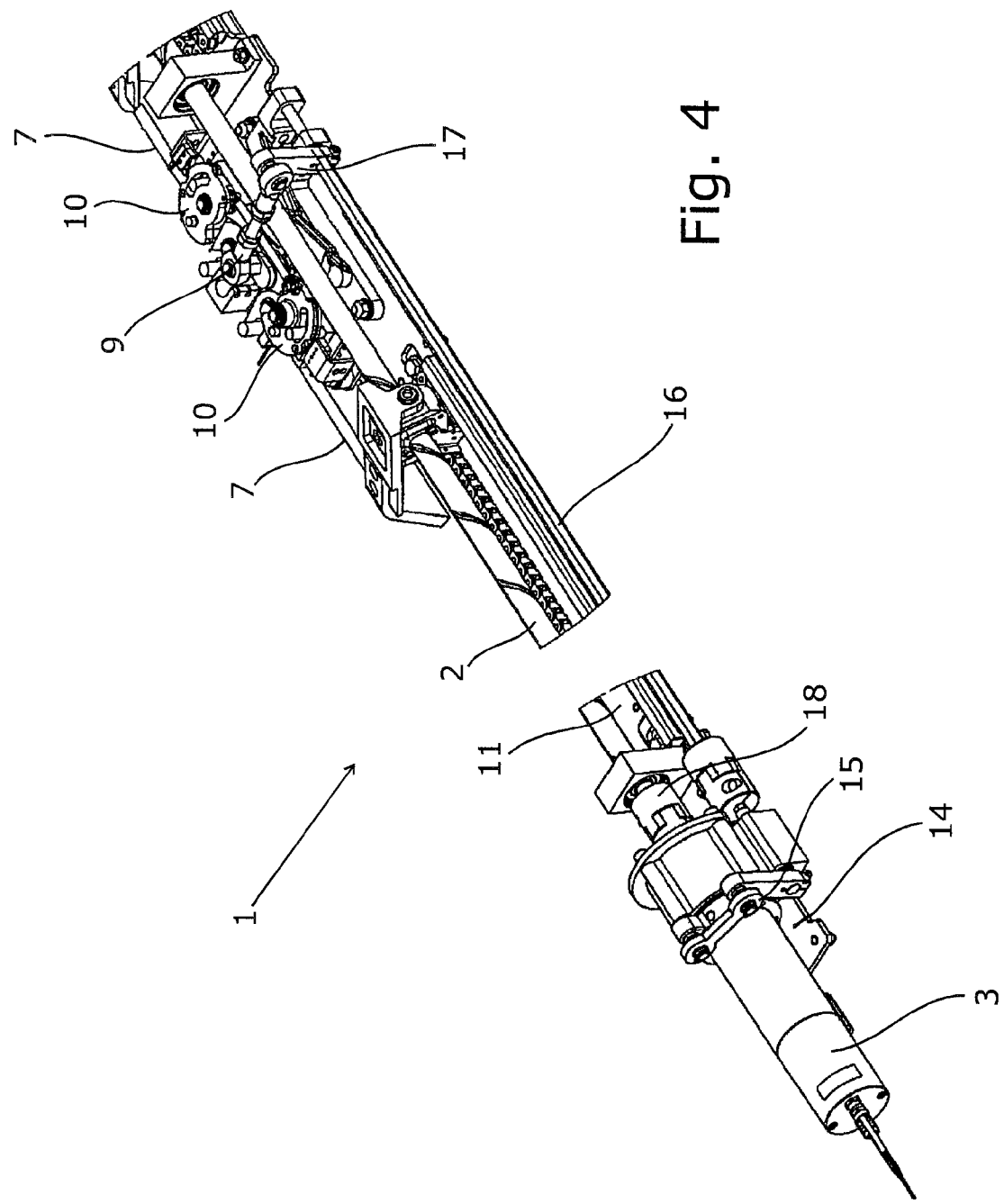
FIG. 4: shows a detailed view in perspective of the form of embodiment shown in FIG. 3.

From FIG. 1 it can already be discerned that on the supporting structure 11, which is to be attached with retainers, not represented, onto the passenger transport vehicle, also not represented, another attachment option 14 for the motor 3 is furthermore provided. As shown in FIG. 3, this attachment option 14, in the form of a plurality of threaded holes, allows a second arrangement relationship of the motor 3 and the first transmission mechanism 2, 6, namely a mounting of the electric motor 3 at one end of the spindle 2, wherein the drive shaft of the motor 3 is arranged coaxially with the axis of the spindle 2 and is connected with the latter via the coupling 18. Here the motor 3 is mounted such that it can rotate. The rotation of the latter, which is effected in the event of restraint or jamming of the first transmission mechanism, or in the event of a change in the drive direction of the motor 3, is transferred via the lever 15, the shaft 16, the lever 17, and the push-pull rod 9 onto the locking mechanism, so as to effect an unlocking of the pawls 21, and thus the rotary latches 8, by means of the motor 3. By means of the two options of attachment 13, 14 onto the supporting structure 11, depending upon the installation conditions, the arrangement relationship can be selected, without having to select, and in particular to replace specific components for this purpose. At most the components need to be supplemented. The high level of component diversity that is otherwise required is advantageously reduced.

The invention claimed is:

1. A drive device for a sliding door, or a pivot-and-slide door, of a passenger transportation vehicle, the drive device comprising:

at least one runner mounted such that it can at least move linearly so as to move a door leaf attached to the latter, a motor attached to the runner or to the passenger transportation vehicle, and a first transmission mechanism between the motor and runner so as to affect at least the longitudinal displacement of the runner, wherein between the motor and the first transmission mechanism at least two attachment options are provided, which differ in the arrangement relationship of the first transmission mechanism and the motor;

a supporting structure on which the at least two attachment options for the motor are provided;

wherein a first attachment option of the at least two attachment options defines a first arrangement relationship where a drive shaft of the motor is arranged coaxially with an input shaft of the first transmission mechanism; and wherein a second attachment option of the at least two attachment options defines a second arrangement relationship where the drive shaft of the motor is arranged in parallel with the input shaft of the first transmission mechanism.

2. The drive device in accordance with the claim 1, wherein a belt transmission is provided between the axis or shaft and the drive shaft of the motor.

3. The drive device in accordance with claim 1, wherein the first transmission mechanism has a spindle transmission with at least one spindle nut in each case attached to the runner, and a spindle.

4. The drive device in accordance with claim 1, wherein a coupling is provided between the first transmission mechanism and the motor.

5. The drive device in accordance with claim 1, wherein a locking mechanism is provided for purposes of locking and unlocking the door leaf, and a second transmission mechanism is provided between the motor and the locking mechanism so as to affect the locking and/or unlocking action by means of the motor.

6. The drive device in accordance with the claim 5, wherein the second transmission mechanism comprises a lever mechanism.

7. The drive device in accordance with claim 5, wherein the motor is mounted such that it has a pivotal or rotary movement capability, and a rotary or pivotal movement of the motor is affected in the event of restraint or jamming of the first transmission mechanism and/or a change of drive direction of the motor, which movement by means of the second transmission mechanism is transferred onto the locking mechanism so as to affect the locking and/or unlocking of the door leaf.

8. An entry/exit facility for a passenger transport vehicle, including the drive device in accordance with claim 1, and with at least one door leaf.

9. A passenger transport vehicle, including an entry/exit facility in accordance with claim 8.

10. The drive device in accordance with claim 6, wherein the motor is mounted such that it has a pivotal or rotary movement capability, and a rotary or pivotal movement of the motor is affected in the event of restraint or jamming of the first transmission mechanism and/or a change of drive direction of the motor, which movement by means of the second transmission mechanism is transferred onto the locking mechanism so as to effect the locking and/or unlocking of the door leaf.

* * * * *